United States Patent

Wallau et al.

Patent Number: 5,409,687
Date of Patent: Apr. 25, 1995

[54] GALLOSILICATE CATALYSTS AND METHOD OF MAKING SAME

[75] Inventors: Martin Wallau, Mainz; Arno Tissler; Roland Thome, both of Bonn; Klaus K. Unger, Bensheim, all of Germany

[73] Assignee: Vereinigte Aluminum-Werke Aktiengesellschaft, Germany

[21] Appl. No.: 255,306

[22] Filed: Jun. 7, 1994

Related U.S. Application Data

[63] Continuation of Ser. No. 909,773, Jul. 7, 1992, abandoned, which is a continuation-in-part of Ser. No. 651,776, Feb. 7, 1991, abandoned.

[30] Foreign Application Priority Data

Feb. 22, 1990 [DE] Germany ................ 40 05 613.9

[51] Int. Cl.$^6$ .............. C01B 39/08; C01B 39/38; B01J 29/40
[52] U.S. Cl. ................................ 423/712; 423/713; 423/DIG. 22; 502/61
[58] Field of Search .......... 423/700, 712, 713, 339, 423/DIG. 22; 502/61

[56] References Cited

U.S. PATENT DOCUMENTS

| | | | |
|---|---|---|---|
| 3,702,886 | 11/1972 | Argauer et al. | 423/DIG. 22 |
| 4,775,520 | 10/1988 | Unger et al. | 423/339 |
| 4,803,060 | 2/1989 | Occelli | 423/326 |
| 4,900,529 | 2/1990 | Sanchez et al. | 423/339 |
| 4,919,907 | 4/1990 | Occelli | 423/713 |
| 4,968,650 | 11/1990 | Chu et al. | 502/61 |
| 5,010,048 | 4/1991 | Petit et al. | 501/61 |
| 5,034,207 | 7/1991 | Kerner et al. | 423/339 |
| 5,064,473 | 11/1991 | Kubo et al. | 423/339 |
| 5,066,420 | 11/1991 | Chevallier | 423/339 |

FOREIGN PATENT DOCUMENTS

| | | | |
|---|---|---|---|
| 160335 | 11/1985 | European Pat. Off. | 502/61 |
| 0323893 | 1/1988 | European Pat. Off. | |
| 207186 | 2/1984 | Germany | 423/328 |
| 59-64520 | 4/1984 | Japan | 423/328 |
| 2102779 | 7/1982 | United Kingdom | |

Primary Examiner—Mark L. Bell
Assistant Examiner—David Sample
Attorney, Agent, or Firm—Brumbaugh, Graves, Donohue & Raymond

[57] ABSTRACT

Gallosilicates can be formed in the absence of structure-guiding organic hydrocarbons or amines by (a) combining water, a base, a gallium material selected from the group consisting of alkali metal gallates, $Ga_2O_3$ and hydrated derivatives of $Ga_2O_3$, and gallium salts optionally in aqueous solution, with a powder consisting essentially of particles of silicon dioxide or a hydrated derivative thereof having a diameter of 0.1 to 5 microns and a specific surface area of 20–22 $m^2/g$ in amounts such that the atomic ratio of silicon to gallium is at least 10 to form an alkaline aqueous reaction mixture; and (b) heating the reaction mixture to produce zeolite-like gallosilicates. These materials are advantageously recovered from the reaction mixture and subjected to ion exchange to replace any alkali metal or alkaline-earth metal ions present with protons.

3 Claims, No Drawings

GALLOSILICATE CATALYSTS AND METHOD OF MAKING SAME

This application is a continuation of application Ser. No. 07/909,773, filed on Jul. 7, 1992, now abandoned, which is a continuation-in-part of U.S. patent application Ser. No. 07/651,776, filed Feb. 7, 1991, now abandoned.

BACKGROUND OF THE INVENTION

This application relates to the production of zeolite-like gallosilicates.

Zeolite-like gallosilicates can be represented by the formula $$(M^{n+})_{x/n}[(GaO_2)_x(SiO_2)_{96-x}]$$

wherein M stands for an alkali-metal or alkaline-earth metal of valence n and x may assume non-zero values of up to 10. Like other zeolites, such zeolite-like gallosilicates belong to the class of tectosilicates. Their structure consists of $TO_4$ tetrahedra, with each oxygen atom being coordinated with two T-atoms. The nature of the T atom is variable, and may be a trivalent atom such as aluminum or gallium as well as the basic quadrivalent silicon.

The $TO_4$ tetrahedra form chains and strata, and build up a well defined system of cavities, passages or pores with apertures of regular molecular dimensions. These apertures determine the accessibility of the interior of the zeolite to substances according to their shape and form and thus impart separatory properties to the porous zeolite material. When alkali-metal or alkaline-earth metal ions are replaced after synthesis with protons, effective heterogeneous acid catalysts are obtained.

Zeolite-like gallosilicates are especially suitable for use as catalysts in the petrochemical industry and for production of valuable organic intermediates. In particular, owing to their dehydrogenating and aromatizing properties, they find application in the conversion of lower alkanes and alkenes, still often simply burned off today, into higher aliphatics, cycloaliphatics and especially simple aromatics. Aromatics such as benzene, toluene or xylene are important starting materials for numerous syntheses in the manufacture of synthetic fibers, polyesters and other plastics. They are also employed as octane-enhancing substances in unleaded gasoline.

Previously known methods of producing zeolite-like gallosilicates require structure-guiding or structure-stabilizing organic compounds. As a rule these are amines, which apart from the cost factor, may represent a not inconsiderable environmental hazard. Organic hydrocarbons have also been used for this purpose. The object of the present invention is to offer an environmentally sound, non-energy-intensive and economical method of producing gallosilicates having catalytic properties and/or a molecular sieve character.

SUMMARY OF THE INVENTION

In accordance with the present invention, gallosilicates can be formed in the absence of structure-guiding organic hydrocarbons or amines by (a) combining water, a base, a gallium material selected from the group consisting of alkali metal gallates, $Ga_2O_3$ and hydrated derivatives of $Ga_2O_3$, and gallium salts optionally in aqueous solution, with a powder consisting essentially of particles of silicon dioxide or a hydrated derivative thereof having a diameter of 0.1 to 5 microns and a specific surface area of from 20 to 22 $m^2/g$ in amounts such that the atomic ratio of silicon to gallium is at least 10, preferably at least 20, to form an alkaline aqueous reaction mixture; and (b) heating the reaction mixture to produce zeolite-like gallosilicates. These materials are advantageously recovered from the reaction mixture and subjected to ion exchange to replace any alkali metal or alkaline-earth metal ions present with protons.

DETAILED DESCRIPTION OF THE INVENTION

It has now been found that the use of fine powders, such as the rounded fines obtained in the metallurgical production of silicon, containing 86–99 wt. % $SiO_2$, permits zeolite-like gallosilicates to be produced while dispensing completely with any use of the aforesaid environmentally hazardous and for the most part toxic structure-guiding substances. Production of zeolite-like gallosilicates according to the invention generates no injurious organic substances in the course of the synthesis, either in the waste water or in the exhaust air. Furthermore, the energy-intensive operation of burning these substances out of the lattice is dispensed with, and gallosilicates produced according to the invention may be converted directly into effective catalysts by ion exchange after synthesis.

The powder used in the method of the invention consists essentially of $SiO_2$, generally containing 86–99% $SiO_2$ by weight. Various impurities may be present, however, without significantly detracting from the properties of the product gallosilicate. For example, typical fines obtained from metallurgical production of silicon also include 0.1–1.0% SiC, 0.2–3.5% $K_2O$, 0.1–0.5% $Al_2O_3$, 0.2–3.5% MgO, 0.1–0.4% $SO_4$, 0.114 1.8% $Na_2O$, 0.05–0.3% CaO, 0.01–1.0% $Fe_2O_3$ and 0.2–2% included, free carbon.

The powder is preferably one in which the particles are rounded and have a diameter of from 0.1 to 5 microns and a specific surface area (BET) of 20–22 $m^2/g$.

In the method of the invention, the $SiO_2$ powder is first dispersed in water, containing a base such as NaOH. To this is added a gallium material such as $Ga_2O_3$, hydrated derivatives of $Ga_2O_3$, alkali metal gallates or gallium salts, optionally in aqueous solution. The gallium material may also be gallium metal dissolved in hydrochloric acid. The gallium materials are preferably added in diluted acid, and the mixture is then stirred. The relative amounts of acid and base should be such that the final reaction mixture is alkaline. The gallium material and the $SiO_2$ powder are added in amounts such that the atomic ratio of silicon to gallium is at least 10. Preferably, the molar ratio of $SiO_2/Ga_2O_3$ is from 40 to 140, the molar ratio $OH/SiO_2$ is from 0.1 to 0.6, the molar ratio of $H_2O/SiO_2$ is from 20 to 1200 and the molar ratio of $Na_2O/SiO_2$ is from 0.1 to 0.4.

More preferably, the molar ratio of $SiO_2/Ga_2O_3$ is from 100 to 130, the molar ratio of $OH/SiO_2$ is from 0.3 to 0.45, the molar ratio of $H_2O/SiO_2$ is from 60–100 and the molar ratio of $Na_2O/SiO_2$ is from 0.15 to 0.25.

The reaction mixture is heated for a period of 1 to 100 hours at a temperature in excess of 413 K. to bring about hydrothermal conversion. Preferably the reaction mixture is heated at a temperature of from 413 to 473 K. for a period of from 1 to 100 hours. Alternatively, the components of the reaction mixture maybe combined at a temperature of from 293 to 353 K., heated at a first temperature of from 413 to 453 K. for a period of from 1 to 20 hours and then heated at a second temperature greater than 453° K. for an additional period of from 1 to 100 hours.

After the hydrothermal conversion, the zeolite-like gallosilicates may be recovered from the reaction mixture, for example by filtration, and subjected directly to ion exchange, i.e., without intermediate treatment steps.

The invention will be illustrated in more detail by the following non-limiting examples.

EXAMPLE 1

1.459 grams of fines occurring in the metallurgical production of silicon containing 86–99 wt. % $SiO_2$ are dispersed in 20 ml water containing 0.435 grams NaOH in solution. To this dispersion is added, with agitation, 0.027 grams gallium dissolved in 15 ml dilute hydrochloric acid. This reaction batch having molar proportions $SiO_2/Ga_2O_3=119$, $OH/SiO_2=0.42$ and $H_2O/SiO_2=84$ is transferred to an autoclave of 50 ml volume and reacted hydrothermally under autogenous pressure at 453 K. for 72 hours. After filtration, approximately 1.2 grams of an at least 40% crystalline gallosilicate are obtained, with an X-ray diffractogram showing at least the X-ray reflections pertaining to the lattice plane distances listed in Table 1.

EXAMPLE 2

74.203 grams of fines occurring in the metallurgical production of silicon containing 86–99 wt. % $SiO_2$ are dispersed with agitation in 1700 ml water containing 21.131 grams of dissolved NaOH in a 2-liter autoclave. Then 1.135 grams gallium dissolved in dilute hydrochloric acid solution is added to the suspension. This reaction batch having molar proportions $SiO_2/Ga_2O_3=125$, $OH/SiO_2=0.4$ and $H_2O/SiO_2=80$ is heated to 413 K. with continuous agitation and kept at that temperature for 6.5 hours. Then it is heated to 433 K. and the reaction mixture is kept at that temperature for 7.5 hours. After cooling of the reaction mixture, filtering and washing, about 70 grams of an at least 50% crystalline gallosilicate is obtained, with an X-ray diffractogram showing at least the X-ray reflections pertaining to the lattice plane distances listed in Table 1.

EXAMPLE 3

1.528 grams of fines occurring in the metal-lurgical production of silicon containing 86–99 wt. % $SiO_2$ are dispersed in 20 ml water containing 0.387 gram of dissolved NaOH. To this dispersion is added, with agitation, 0.027 gram gallium dissolved in 15 ml dilute hydrochloric acid. This reaction batch having molar proportions $SiO_2/Ga_2O_3=125$, $OH/SiO_2=0.35$ and $H_2O/SiO_2=80$ is transferred to an autoclave of 50 ml volume and stirred for 48 hours at 453K in a drying cabinet having an overhead stirring means with a frequency of 0.5 hertz. After cooling of the reaction mixture, filtering and washing, about 1.3 grams of an at least 60% crystalline gallosilicate is obtained, with an X-ray diffractogram showing at least the X-ray reflections pertaining to the lattice plane distances listed in Table 1.

TABLE 1

Lattice plane distances d for the gallosilicates synthesized in Examples 1 to 3

| d (ångström) | Intensity |
| --- | --- |
| 11.2 ± 0.2 | strong |
| 10.0 ± 0.2 | strong |
| 6.4 ± 0.1 | weak |
| 5.95 ± 0.1 | weak |
| 5.6 ± 0.1 | weak |
| 3.87 ± 0.05 | strong |
| 3.83 ± 0.05 | strong |
| 3.76 ± 0.05 | weak |
| 3.74 ± 0.05 | medium–strong |
| 3.66 ± 0.05 | weak |
| 2.01 ± 0.02 | weak |
| 1.99 ± 0.02 | weak |

EXAMPLE 4

Gallosilicate-material synthesized as described in Example 3 of the present invention was ion-exchanged 3 times for 1 h under reflux at 100° C. with a 1N ammonium nitrate solution, dried at 120° C. and activated at 400° C. over 6 hours.

Catalytic measurements were conducted in a flow-type apparatus in a fixed-bed reactor at a temperature of 550° C. and a WHSV of propane in $N_2$ of 1 $h^{-1}$. The material shows a conversion of more than 90% and a selectivity to aromatics of more than 60%.

EXAMPLE 5

(Comparison example)

Alumosilicate-material with a $SiO_2/Al_2O_3$ ratio of 55 was synthesized as described in EPA 0330 855 A 2, ion-exchanged, activated and tested as described in Example 4 of this invention.

The material shows a conversion of 40% and a selectivity to aromatics of 40%.

EXAMPLE 6

(Comparison example)

Alumosilicate-material from Example 5 was ion-exchanged after activation at 450° C. with an aqueous gallium-sulphate solution of 10 grams gallium/liter at 100° C. for 1 h. The gallium content in the alumosilicate after drying was 2 weight %. The material was activated again under nitrogen and measured as described in Example 4.

The material shows a conversion of 60% and a selectivity to aromatics of 48%.

We claim:

1. A method for preparing gallosilicates comprising the steps of;
   (a) preparing an alkaline aqueous reaction mixture consisting of water, a base, a gallium material selected from the group consisting of gallium metal dissolved in hydrochloric acid, alkali metal gallates, $Ga_2O_3$ and hydrated derivatives of $Ga_2O_3$ and gallium salts, and a powder produced during the metallurgical production of silicon consisting essentially of particles of silicon dioxide or a hydrated derivative thereof having a diameter of 0.1 to 5 microns and a specific surface area of 20 to 22 $m^2/g$ in amounts such that the atomic ratio of silicon to gallium is at least 10; and
   (b) heating the reaction mixture in the absence of structure-guiding, organic hydrocarbon or nitrogen compounds to form a zeolite-like gallosilicate of the formula $(M^{n+})_{x/n}[(GaO_2)_x(SiO_2)_{96-x}]$ wherein M is an alkali metal or alkaline earth metal of valence n and X is a positive number less than or equal to 10 by hydrothermal crystallization, wherein the zeolite-like gallosilicate has an x-ray diffraction pattern showing at least the x-ray reflections pertaining to the following lattice distances:

| d (ångström) | Intensity |
|---|---|
| 11.2 ± 0.2 | strong |
| 10.0 ± 0.2 | strong |
| 6.4 ± 0.1 | weak |
| 5.95 ± 0.1 | weak |
| 5.6 ± 0.1 | weak |
| 3.87 ± 0.05 | strong |
| 3.83 ± 0.05 | strong |
| 3.76 ± 0.05 | weak |
| 3.74 ± 0.05 | medium-strong |
| 3.66 ± 0.05 | weak |
| 2.01 ± 0.02 | weak |
| 1.99 ± 0.02 | weak. |

2. A gallosilicate compound prepared by the steps of
(a) preparing an alkaline aqueous reaction mixture consisting of water, a base, a gallium material selected from the group consisting of gallium metal dissolved in hydrochloric acid, alkali metal gallates, $Ga_2O_3$ and hydrated derivatives of $Ga_2O_3$ and gallium salts, and a powder produced during the metallurgical production of silicon consisting essentially of particles of silicon dioxide or a hydrated derivative thereof having a diameter of 0.1 to 5 microns and a specific surface area of 20 to 22 $m^2/g$ in amounts such that the atomic ration of silicon to gallium is at least 10; and
(b) heating the reaction mixture in the absence of structure-guiding, organic hydrocarbon or nitrogen compounds to form a zeolite-like gallosilicate of the formula $(M^{n+})_{x/n}[(GaO_2)_x(SiO_2)_{96-x}]$ wherein M is an alkali metal or alkaline earth metal of valence n and X is a positive number less than or equal to 10 by hydrothermal crystallization, wherein the zeolite-like gallosilicate has an x-ray diffraction pattern showing at least the x-ray reflections pertaining to the following lattice distances:

| d (ångström) | Intensity |
|---|---|
| 11.2 ± 0.2 | strong |
| 10.0 ± 0.2 | strong |
| 6.4 ± 0.1 | weak |
| 5.95 ± 0.1 | weak |
| 5.6 ± 0.1 | weak |
| 3.87 ± 0.05 | strong |
| 3.83 ± 0.05 | strong |
| 3.76 ± 0.05 | weak |
| 3.74 ± 0.05 | medium-strong |
| 3.66 ± 0.05 | weak |
| 2.01 ± 0.02 | weak |
| 1.99 ± 0.02 | weak. |

3. A gallosilicate catalyst prepared by the steps of
(a) preparing an alkaline aqueous reaction mixture consisting of water, a base, a gallium material selected from the group consisting of gallium metal dissolved in hydrochloric acid, alkali metal gallates, $Ga_2O_3$ and hydrated derivatives of $Ga_2O_3$ and gallium salts, and a powder produced during the metallurgical production of silicon consisting essentially of particles of silicon dioxide or a hydrated derivative thereof having a diameter of 0.1 to 5 microns and a specific surface area of 20 to 22 $m^2/g$ in amounts such that the atomic ratio of silicon to gallium is at least 10
(b) heating the reaction mixture in the absence of structure-guiding, organic hydrocarbon or nitrogen compounds to form a zeolite-like gallosilicate of the formula $(M^{n+})_{x/n}[(GaO_2)_x(SiO_2)_{96-x}]$ wherein M is an alkali metal or alkaline earth metal of valence n and X is a positive number less than or equal to 10 by hydrothermal crystallization to, wherein the zeolite-like gallosilicate has an x-ray diffraction pattern showing at least the x-ray reflections pertaining to the following lattice distances:

| d (ångström) | Intensity |
|---|---|
| 11.2 ± 0.2 | strong |
| 10.0 ± 0.2 | strong |
| 6.4 ± 0.1 | weak |
| 5.95 ± 0.1 | weak |
| 5.6 ± 0.1 | weak |
| 3.87 ± 0.05 | strong |
| 3.83 ± 0.05 | strong |
| 3.76 ± 0.05 | weak |
| 3.74 ± 0.05 | medium-strong |
| 3.66 ± 0.05 | weak |
| 2.01 ± 0.02 | weak |
| 1.99 ± 0.02 | weak; |

(c) recovering the crystallized zeolite-like gallosilicate from the reaction mixture after the heating step; and
(d) subjecting the recovered crystals to ion exchange to replace any alkali or alkaline-earth metal ions present with protons.

* * * * *

UNITED STATES PATENT AND TRADEMARK OFFICE
CERTIFICATE OF CORRECTION

PATENT NO. : 5,409,687

DATED : April 25, 1995

INVENTOR(S) : Wallau et al.

It is certified that error appears in the above-indentified patent and that said Letters Patent is hereby corrected as shown below:

Col. 2, line 40, "0.114" should read --0.1--

Col. 5, line 39, "ration" should read --ratio--

Col. 6, line 35, "crystallization to," should read --crystallization,--

Signed and Sealed this

Twenty-sixth Day of December, 1995

Attest:

BRUCE LEHMAN

*Attesting Officer*           *Commissioner of Patents and Trademarks*